US010410664B1

(12) United States Patent
Cheng et al.

(10) Patent No.: US 10,410,664 B1
(45) Date of Patent: Sep. 10, 2019

(54) NEAR-FIELD TRANSDUCER WITH THERMALLY ROBUST PEG EMBEDDED INTO AN ENLARGED PORTION

(71) Applicant: Seagate Technology LLC, Cupertino, CA (US)

(72) Inventors: Yuhang Cheng, Edina, MN (US); Nan Zhou, Eden Prairie, MN (US); Yongjun Zhao, Eden Prairie, MN (US); Huaqing Yin, Eden Prairie, MN (US); Weibin Chen, Bloomington, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/939,520

(22) Filed: Mar. 29, 2018

Related U.S. Application Data

(60) Provisional application No. 62/486,092, filed on Apr. 17, 2017.

(51) Int. Cl.
*G11B 5/09* (2006.01)
*G11B 5/60* (2006.01)
*G11B 5/31* (2006.01)
*G11B 5/00* (2006.01)

(52) U.S. Cl.
CPC .......... *G11B 5/6082* (2013.01); *G11B 5/3136* (2013.01); *G11B 2005/0021* (2013.01)

(58) Field of Classification Search
None
See application file for complete search history.

(56) References Cited

U.S. PATENT DOCUMENTS

| 8,514,673 | B1 | 8/2013 | Zhao et al. | |
|---|---|---|---|---|
| 9,019,803 | B1* | 4/2015 | Jin | G11B 13/08 369/13.33 |
| 9,147,427 | B1 | 9/2015 | Lee et al. | |
| 9,245,573 | B2 | 1/2016 | Sahoo et al. | |
| 9,305,575 | B2 | 4/2016 | Zhao et al. | |
| 9,336,800 | B2 | 5/2016 | Wessel et al. | |
| 9,384,770 | B2 | 7/2016 | Chen et al. | |
| 9,449,625 | B1 | 9/2016 | Vossough et al. | |
| 9,449,626 | B2 | 9/2016 | Lee et al. | |
| 9,502,070 | B2 | 11/2016 | Cheng et al. | |
| 9,799,352 | B1 | 10/2017 | Chen et al. | |
| 2010/0123965 | A1* | 5/2010 | Lee | G11B 5/314 360/59 |
| 2011/0205864 | A1* | 8/2011 | Huang | G02B 6/102 369/13.33 |
| 2013/0330573 | A1 | 12/2013 | Zhao et al. | |
| 2013/0343167 | A1 | 12/2013 | Zou et al. | |
| 2014/0050058 | A1 | 2/2014 | Zou et al. | |

(Continued)

*Primary Examiner* — Peter Vincent Agustin
(74) *Attorney, Agent, or Firm* — Hollingsworth Davis, LLC

(57) ABSTRACT

A near-field transducer has an enlarged portion with a layer of soft plasmonic material. A peg is embedded in a lower part of the enlarged portion that faces a media-facing surface. The peg has an elongated outer part that extends from a lower edge of the enlarged portion towards the media-facing surface and an embedded part that is embedded within the enlarged portion. The embedded part could be any shape. The peg is formed of a thermally robust plasmonic material.

18 Claims, 10 Drawing Sheets

(56) References Cited

U.S. PATENT DOCUMENTS

| | | | |
|---|---|---|---|
| 2014/0307534 A1* | 10/2014 | Zhou | G11B 13/08 |
| | | | 369/13.33 |
| 2014/0376341 A1 | 12/2014 | Wessel et al. | |
| 2014/0376344 A1 | 12/2014 | Zhao et al. | |
| 2015/0131415 A1* | 5/2015 | Peng | G11B 5/1278 |
| | | | 369/13.32 |
| 2016/0133288 A1 | 5/2016 | Zhao et al. | |
| 2016/0133291 A1 | 5/2016 | Chen et al. | |
| 2016/0351209 A1* | 12/2016 | Chen | G11B 5/314 |
| 2016/0351214 A1 | 12/2016 | Kautzky et al. | |
| 2016/0351221 A1 | 12/2016 | Blaber et al. | |
| 2016/0351222 A1 | 12/2016 | Blaber et al. | |

* cited by examiner

NEAR-FIELD TRANSDUCER WITH THERMALLY ROBUST PEG EMBEDDED INTO AN ENLARGED PORTION

RELATED APPLICATIONS

This application claims the benefit of Provisional Patent Application Ser. No. 62/486,092 filed on Apr. 18, 2017 and which is hereby incorporated herein by reference in its entirety.

SUMMARY

The present disclosure is directed to a near-field transducer with a thermally-robust peg embedded into an enlarged portion. In one embodiment, a near-field transducer has an enlarged portion with a layer of soft plasmonic material. A peg is embedded in a lower part of the enlarged portion that faces a media-facing surface. The peg has an elongated outer part that extends from a lower edge of the enlarged portion towards the media-facing surface and an embedded part that is embedded within the enlarged portion. The embedded part could be any shape. The peg is formed of a thermally robust plasmonic material.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer, which raises the media temperature locally, reducing the writing magnetic field required for high-density recording.

Generally, the NFT is formed by depositing thin-film of a plasmonic material such as gold, silver, copper, etc., at or near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect integrity of the NFT, for example, causing it to become misshapen. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses are described to increase the thermal robustness of the NFT.

Figure 1:
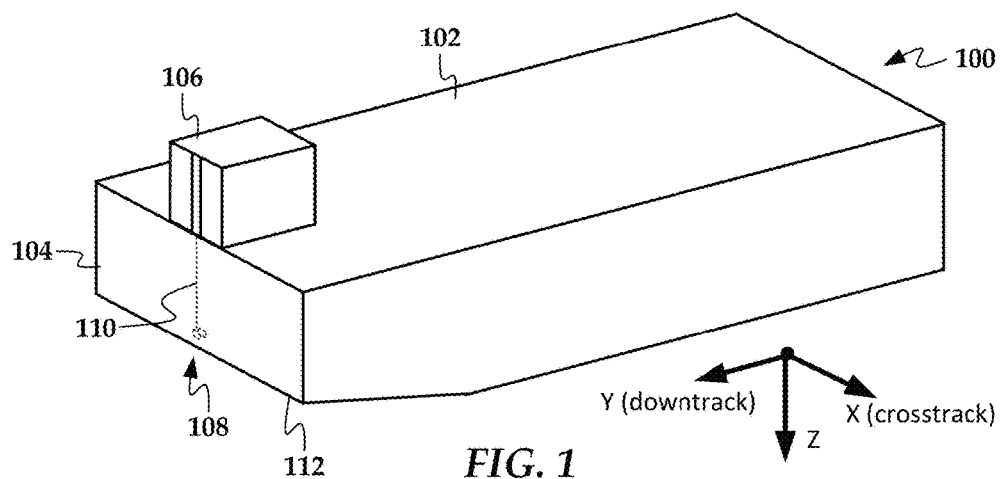
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
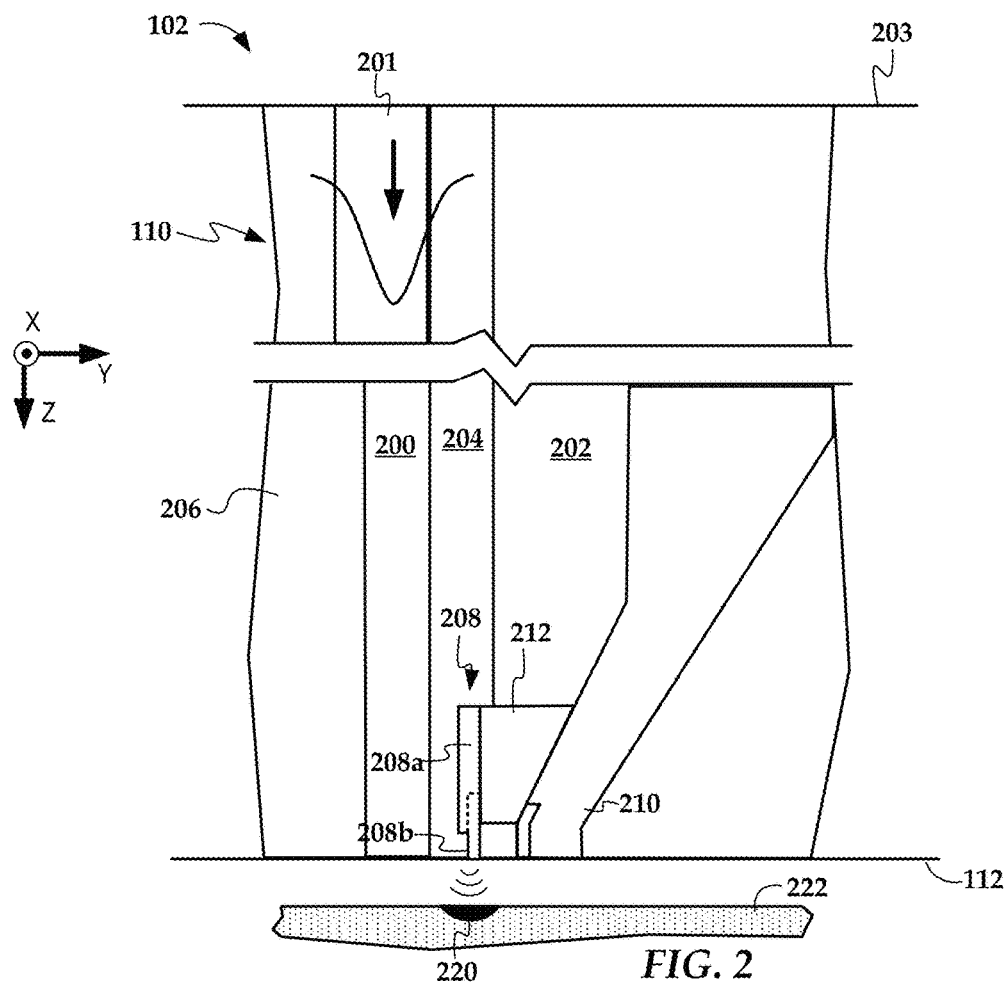
FIG. 2 is a cross-sectional view of a slider along a down-track plane according to according to an example embodiment.

In FIG. 2, a cross-sectional views show details of a slider body 102 according to an example embodiment. The waveguide 110 includes a core 200, top cladding layer 202, side cladding layer 204, and bottom cladding 206. A waveguide input coupler 201 at a top surface 203 of the slider body 102 couples light from the light source 106 to the waveguide 110. The waveguide input coupler 201 receives light from the light source 106 and transfers the light to the core 200. The waveguide core 200 is made of dielectric materials of high index of refraction, for instance, AlN (aluminum nitride), $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The cladding layers 202, 204, 206 are each formed of a dielectric material having a refractive index lower than the core 200. The cladding can be, for instance, Al$_2$O$_3$ (aluminum oxide), SiO and SiO$_2$ (silica).

The core 200 delivers light to an NFT 208 that is located within the side cladding layer 204 at the media-facing surface 112. A write pole 210 (which is a distal part of a magnetic write transducer) is located near the NFT 208. The magnetic write transducer may also include a yoke, magnetic coil, return pole, etc. (not shown). A heat sink 212 thermally couples the NFT 208 to the write pole 210. The magnetic coil induces a magnetic field through the write pole 210 in response to an applied current. During recording, an enlarged portion 208a (e.g., a rounded disk) of the NFT 208 achieves surface plasmon resonance in response to light delivered from the core, and the plasmons are tunneled via a peg 208b out the media-facing surface 112. The energy delivered from the NFT 208 forms a hotspot 220 within a recording layer of a moving recording medium 222. The write pole 210 sets a magnetic orientation in the hotspot 220, thereby writing data to the recording medium.

As noted above, the NFT 208 reaches high temperatures during recording, and over time this can cause instability. While the enlarged part 208b of the NFT 208 is generally formed from a material such as gold, the peg 208b may be formed from a high-melting-point material, such as Rh, Ir, Pt, Pd, etc., to improve peg thermal stability. In existing designs, one side of the peg is in direct contact with a dielectric. Due to dielectric overmill, the gold disc 208a dips into the dielectric. Due to low thermal conductivity of the dielectric, the peg 208b reaches high temperature, over time leading to poor structural integrity at the peg-to-disc interface.

Figure 3:
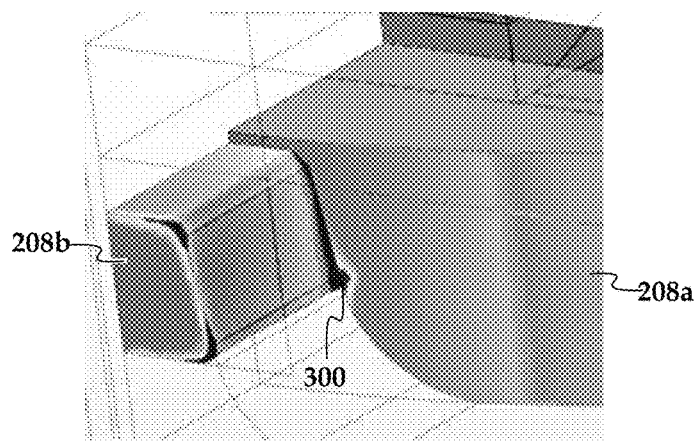
FIG. 3 is a thermal plot showing peak temperature regions of a near-field transducer according to an example embodiment.

In FIG. 3, a three-dimensional contour plot shows results of a thermal model of a disk 208a and peg 208b according to an example embodiment. The dark areas in the plot indicate high temperatures, in particular at the peg/disc interface 300. The high temperature at this interface 300, as well as the acute angle of the peg 208b with the gold disc 208a is suspected as causing disc/peg separation in this region. This disc/peg separation results in degraded performance and may cause early failure of the read/write head.

In FIGS. 4a-4f, cross-sectional views show peg features of a near-field transducer according to example embodiments. All of the diagrams in FIGS. 4b-4f use the same coordinate system shown in FIG. 4a and the hatching indicates materials shown in the legend of FIG. 4a. In these embodiments, the peg 208b may have a constant cross-section throughout its length, or may have a part with an enlarged cross-section embedded within the enlarged portion 208a of the NFT 208 (see, e.g., FIGS. 5a-5d). In some embodiments, the front edge of the enlarged portion at the lower part may not align with the front edge of the enlarged portion at the upper part.

Figure 4A:
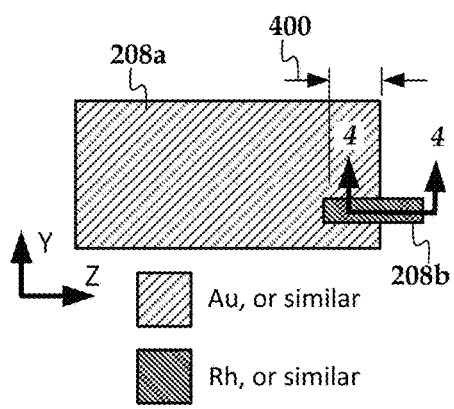
FIGS. 4a-4f are side views of near-field transducers according to example embodiments.

In the embodiment shown in FIG. 4a, a distance 400 that the peg 208b is embedded into the enlarged portion 208a can be increased, and in some configurations the peg 208b may extend along the whole length (z-dimension) of the enlarged portion 208a. In embodiments described herein, the distance 400 may be at least 10% of a total z-dimension of the enlarged portion 208a. This reduce impact to NFT efficiency due to the different peg material, because surface plasmons are generated on the outer surfaces of the enlarged portion 208a and not near the center (e.g., below the skin depth of the disc material).

By extending the distance 400 that the peg 208b is embedded in the enlarged portion 208a, the peg/disk interface temperature can be decreased by pushing a large part of the interface away from the hot zone, such that the enlarged portion 208a sinks heat away from the tip of the peg 208b due to the peg 208b. The enlarged portion 208a is typically made from a metal such as gold, silver, copper, and their alloys, etc., which typically has good heat conduction properties in addition to being an efficient surface plasmon generator. Extending distance 400 also increase the bimetal (e.g., Rh/Au) contact area to improve peg/disc adhesion.

Figure 4B:
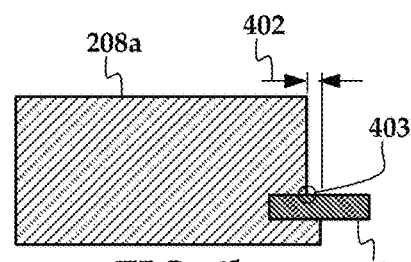
Figure 4C:
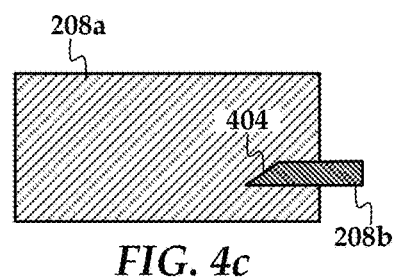
Figure 4D:
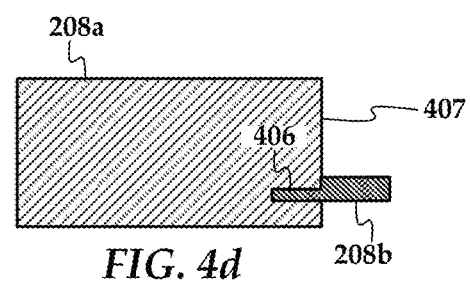
Figure 4E:
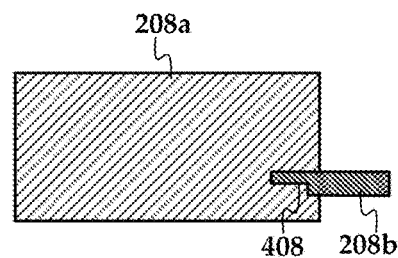

As seen in FIG. 4b, one downtrack (y-direction) side of the embedded part of the peg 208b may be exposed, e.g., by creating a recess 402 in the enlarged portion. This moves the bimetal interface on at least one side of the NFT further away from the hottest regions of the peg 208b. In the embodiments shown in FIGS. 4c, 4d, and 4f, an end of the peg 208b embedded in the enlarged portion has a taper 406 or step 406, 408 that result in a smaller thickness for at least part of the embedded portion of the peg. Note that the step 406 is even with the lower edge 407 of enlarged portion 208a (the lower edge 407 facing the recording medium), whereas step 408 is embedded within the enlarged portion 208a. In the embodiment shown in FIG. 4f, the peg 208b has an extension 410 that covers the lower edge of the enlarged portion and part of one side 412 of the enlarged portion 208a.

In FIGS. 5a-5d, partial cross-sectional, substrate-parallel plan views show peg features of near-field transducers according to example embodiments. All of the diagrams in FIGS. 5b-5d use the same coordinate system shown in FIG. 5a and the hatching indicates materials shown in the legend of FIG. 5a. While the enlarged portions 208a are shown as rounded rectangles (also referred to as a stadium shape) these embodiments may use different shaped enlarged portions 208, e.g., rectangular, triangular, etc.

In the embodiments shown in FIGS. 5a-5d, the pegs 208b include elongated outer parts 500, 510, 520, 530 that extend from lower edges 502, 512, 522, 532 of the enlarged portions 208a towards a media-facing surface (not shown) of a recording head. The pegs 208b include embedded parts 504, 514, 524, 534 that are embedded within the enlarged portions 208a. Lower edge profiles 504a, 514a, 524a, 534a of the embedded parts 504, 514, 524, 534 have an outline that match that of lower edges 502, 512, 522, 532 of the enlarged portions 208a. Because the peg 208b is made of a thermally robust material, the embedded parts 504 514, 524, 534 helps prevent separation at the corners between the peg 208b and lower edges 502, 512, 522, 532 of the enlarged portion 208a.

In the various embodiments shown in FIGS. 5a-5d, the lower edge profiles 504a, 514a, 524a, 534a cover different amounts of the lower edges 502, 512, 522, 532. For example, lower edge profile 504a extends along a small fraction (e.g., around 10% of the length) of the edge 502, while lower edge profile 524a covers a relatively large fraction (e.g., 80%) of the edge 522. The extents of the lower edge profiles 504a, 514a, 524a, 534a can be changed to balance mechanical strength versus NFT efficiency. Similarly, the extents of the embedded parts 504, 514, 524, 534 into the enlarged portions 208a can be changed from what is shown here, e.g., extended further into the enlarged portions to increase heat sinking.

The embedded parts 504, 514, 524, 534 each have different edge profiles 506, 516, 526, 536 facing away from the elongated out parts 500, 510, 520, 530. Embedded part 504 in FIG. 5a has a rectangular profile 506 with three, right-angled edges. Embedded part 514 in FIG. 5b has a flat profile 506 that extends between two points on the lower edge 512. Embedded part 524 in FIG. 5c has a trapezoidal profile 526 with three, non-right-angled edges. Embedded part 534 in FIG. 5a has profile 536 that includes a combination of a flat profile as in FIG. 5b together with a rectangular central projection similar to profile 506 in FIG. 5a. A similar combination (not shown) may be made with a trapezoidal central projection instead of a rectangular central projection.

Figure 6:
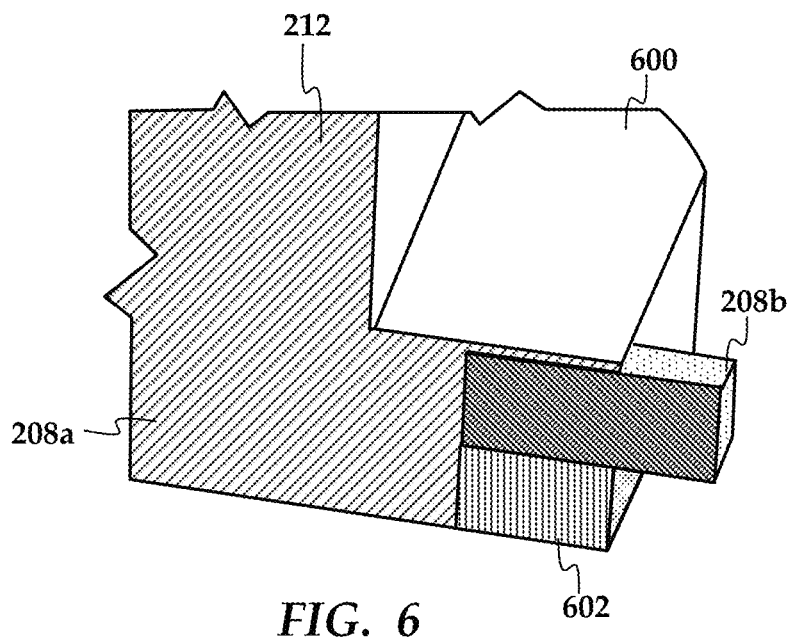
FIG. 6 is a cutaway perspective view of a near-field transducer according to an example embodiment.

In FIG. 6, a perspective cutaway view shows details of a near-field transducer according to an example embodiment. In this view, the peg 208b is made of thermally robust material (e.g., Rh) extends from enlarged portion 208a. Heat sink 212 is also seen in this view. The peg 208b is covered by side 600 of the enlarged portion. Region 602 may be filled with a dielectric in a baseline configuration. In an alternate configuration, referred to herein as Design I, the regions 602 is instead filled with the same material (e.g., Au) as the enlarged portion 208a.

Figure 7:
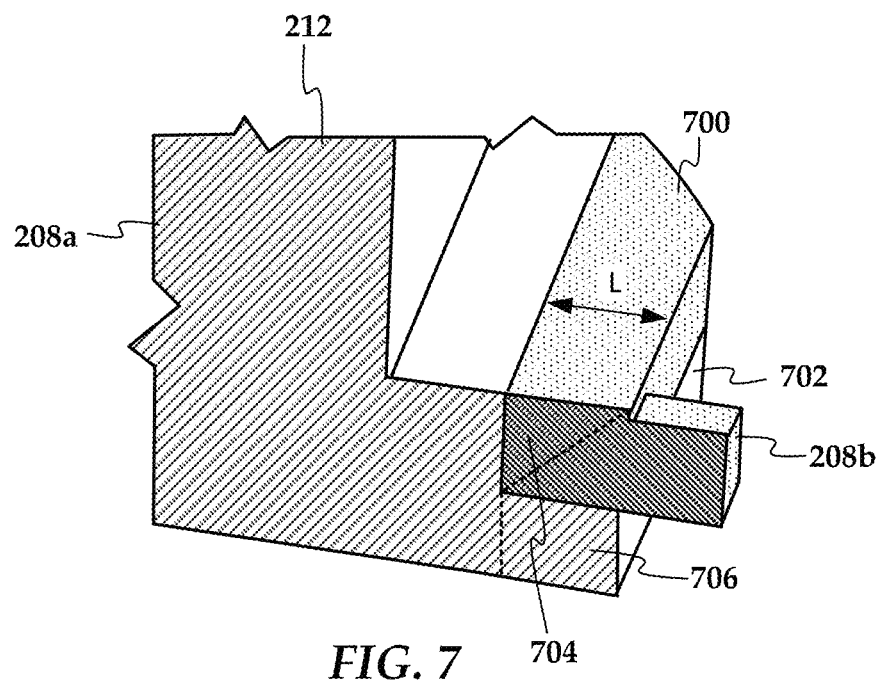
FIG. 7 is a cutaway perspective view of a near-field transducer according to another example embodiment.

In FIG. 7, a perspective cutaway view shows details of a near-field transducer according to another example embodiment. In this view, the peg 208b is made of thermally robust material (e.g., Rh) and extends from enlarged portion 208a. Heat sink 212 is also seen in this view. The peg 208b also has an embedded part 700 extending along and matching a profile of a lower edge 702 of the enlarged portion 208a. This configuration is referred to herein as Design II. A part of the embedded part may be milled away, as indicated by dashed line that defines region 704. The region 704 is filled with the same material as the enlarged portion 208a, and this is referred to herein as Design III. The embedded part 700 could be exposed on one side as shown here, or could be covered with Au as shown in FIGS. 4 and 6 to prevent separation at the interface between the gold enlarged part 208a and the embedded part 700. In another embodiment, the embedded part 700 could extend to fill the region 706, such that the entire lower part of the near-field transducer facing the recording medium is formed of the thermally robust material.

An analysis was performed on the three designs described above, and the results are summarized in Table 1 below. The analysis estimated downtrack thermal gradient (DT-TG), needed laser current (Ieff), and temperature increase (ΔT) of both the peg and enlarged portion (disk). The analysis predicts that the peg in Designs I-III will be about 50K (or more) cooler than the baseline. The thermal gradient is decreased by 0.6~0.8K/nm for Design II, although the 10 nm mill for Design III reduces the thermal gradient penalty to ~0.38K/nm.

TABLE 1

| Configuration | DT-TG(K/nm) | Ieff(mA) | Peg ΔT(K) | Disc ΔT(K) |
|---|---|---|---|---|
| Baseline | 8.56 | 6.12 | 273 | 167 |
| Design I | 8.54 | 5.83 | 208 | 129 (108) |
| Design II L = 30 nm | 7.97 (−0.6) | 6.67 | 222 (−51) | 127 |
| Design III L = 30 nm, Rh mill 10 nm | 8.18 (−0.38) | 6.48 | 222 (−51) | 135 (123) |

Figure 8A:
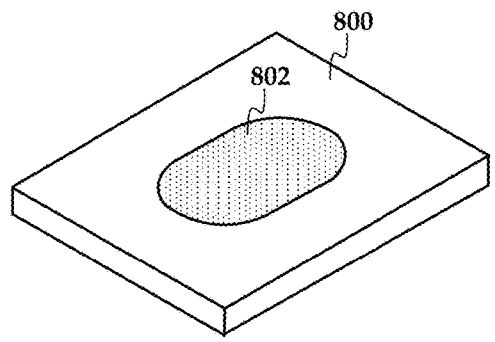
FIGS. 8a-8e are perspective views showing a manufacturing process according to an example embodiment.
Figure 8B:
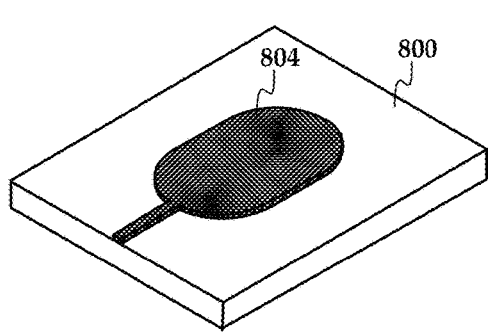

In FIGS. 8a-8e, perspective views show a process flow for manufacturing an NFT according to an example embodiment. As seen in FIG. 8a, a void is formed (e.g., via photolithography) in a dielectric material layer 800 (e.g., alumina). The void has the shape of the enlarged portion of the NFT and is filled with plasmonic material 802 (e.g., Au). The plasmonic material 802 and dielectric material layer 800 are planarized, e.g., via chemical-mechanical planarization (CMP), to a predetermined thickness. As seen in FIG. 8b, a thin (e.g., 20 nm) layer of a thermally robust material (e.g., Rh) is deposited, formed in the outline of the enlarged portion and peg.

Figure 8C:
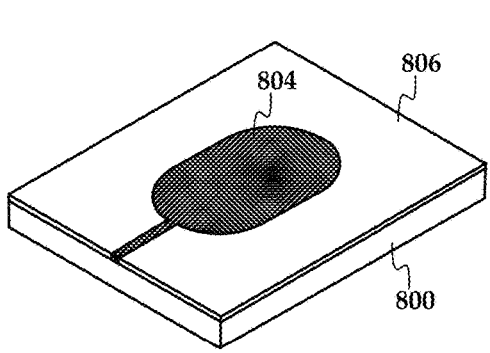
Figure 8D:
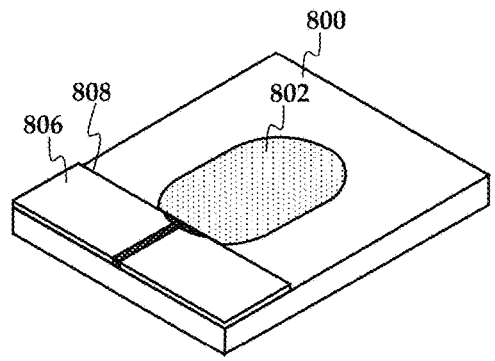
Figure 8E:
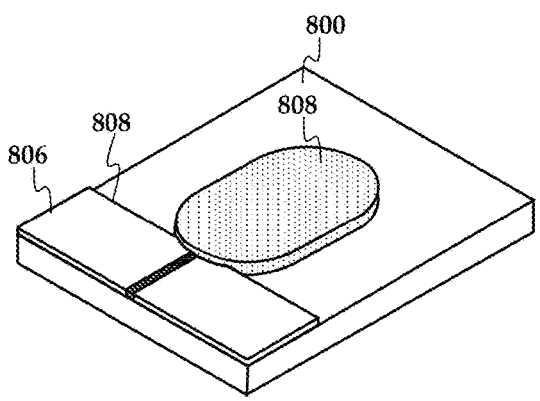

As seen in FIG. 8c, an additional layer 806 of dielectric material is deposited over the thermally robust material 804, then CMP is used to bring the layer of both materials 804, 806 to the desired peg thickness. As seen in FIG. 8d, a milling operation creates an edge 808 that defines the shape of the embedded part of the peg. As seen in FIG. 8e, additional material 808 of the enlarged portion is deposited over material 808 and the embedded part of the peg, e.g., via a lift-off process.

Figure 9A:
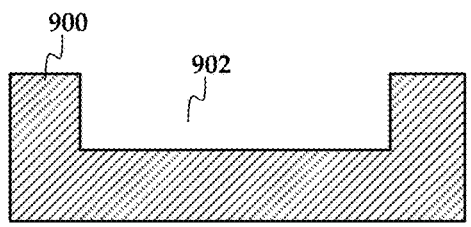
FIGS. 9a-9h are side views showing a manufacturing process according to another example embodiment.
Figure 9B:
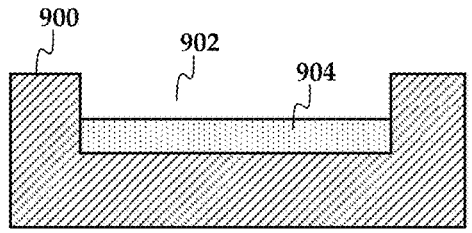
Figure 9C:
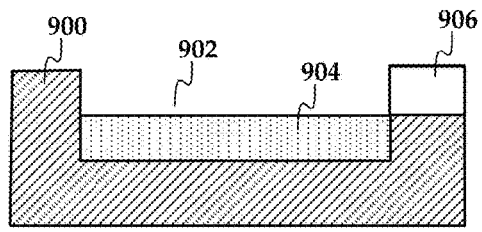
Figure 9D:
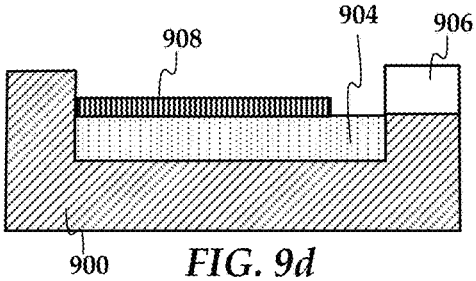

In FIGS. 9a-9h, side views show a process flow for manufacturing an NFT according to another example embodiment. As seen in FIG. 9a, a void 902 is formed (e.g., via photolithography) in a dielectric material layer 900 (e.g., alumina). The void 902 has the shape of the enlarged portion of the NFT. As seen in FIG. 9b, the void 902 is filled with plasmonic material 904 (e.g., Au). As seen in FIG. 9c, a trench 906 is formed in the wall of the dielectric material 900. In FIG. 9d, a release layer 908 is shown being deposited on the plasmonic material 904. The release layer 908 is shaped such that removal of the release layer 908 together with subsequently deposited layer will form a top edge of the embedded part of the peg.

Figure 9E:
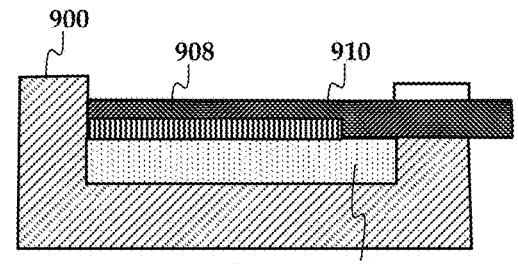
Figure 9F:
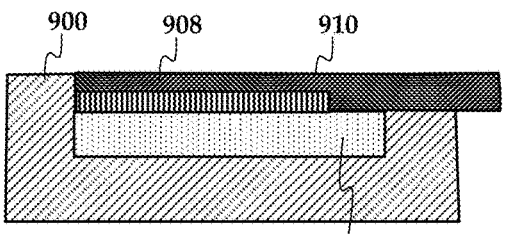
Figure 9G:
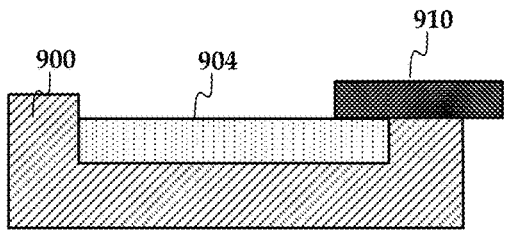
Figure 9H:
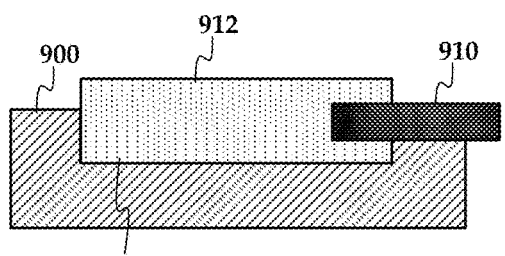

As seen in FIG. 9e, a thermally robust material 910 (e.g., Rh) is deposited over the release layer 908, the enlarged portion material 906, and within the trench 906. This material 910 forms the peg. As seen in FIG. 9f, the layers are planarized such that the surrounding dielectric material 900 is level with the thermally robust material 910. In FIG. 9g, the parts of the thermally robust material 910 overlapping the release layer 908 have been removed, thus giving the thermally robust material 910 the final shape of the peg. As seen in FIG. 9h, additional material 912 (e.g., Au) is deposited to create the final shape of the enlarged portion and other structures, e.g., a heat sink.

Figure 10:
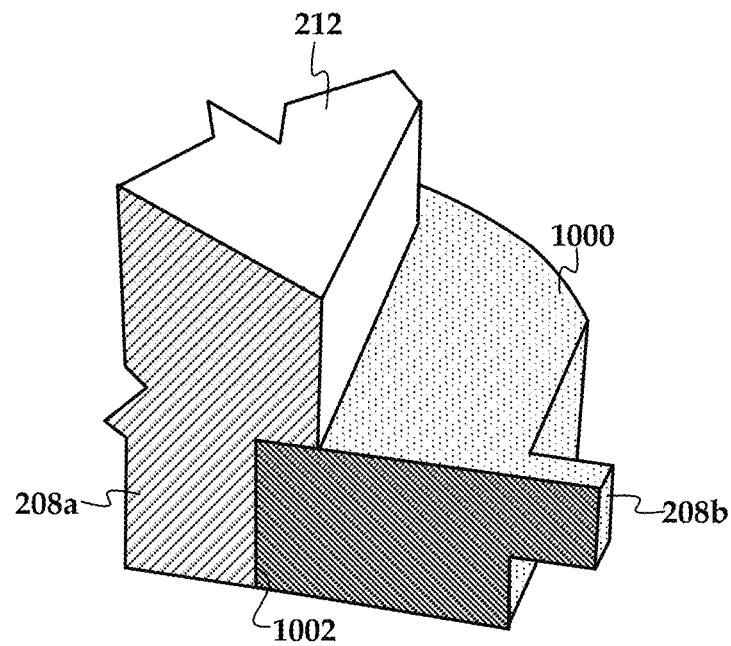
FIGS. 10 and 11 are cutaway perspective views of near-field transducers according to example embodiments.

In FIG. 10, a perspective cutaway view shows details of a near-field transducer according to another example embodiment. A peg 208b is made of thermally robust material and extends from enlarged portion 208a. Heat sink 212 extends from one side of the enlarged portion 208a. The peg 208b has an embedded part 1000 extending from a lower edge 1002 of the enlarged portion 208a. Note that in this example, the embedded part 1000 does not have a profile that matches the lower edge 1002, although the embedded part 1000 may extend a profile of the enlarged portion 208a, e.g., be continuous with a curve of the enlarged portion 208a where the enlarged portion 208a and embedded part 1000 meet at an outer perimeter of the near-field transducer.

Figure 11:
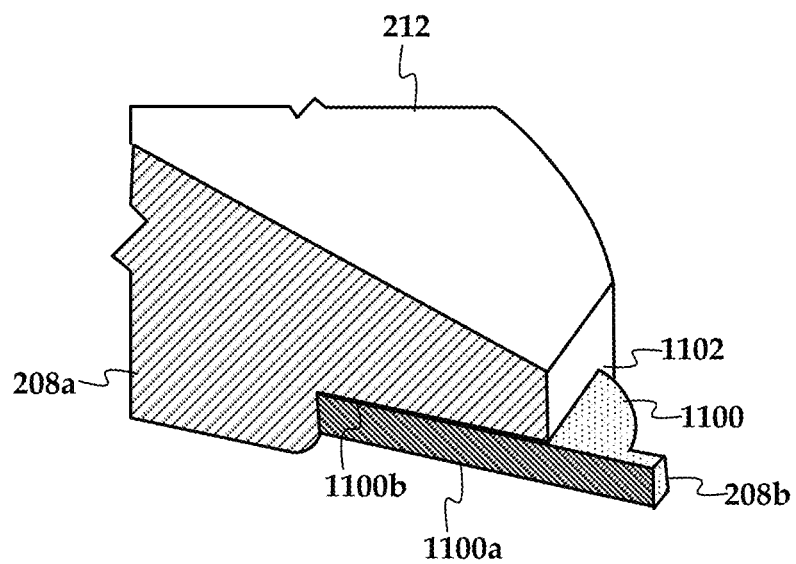

In FIG. 11, a perspective cutaway view shows details of a near-field transducer according to another example embodiment. A peg 208b is made of thermally robust material and extends from enlarged portion 208a. Heat sink 212 extends from one side of the enlarged portion 208a. Peg 208b has an embedded part 1100 extending from a lower edge 1102 of the enlarged portion 208a. Note that in this example, the embedded part 1100 does not have a profile that matches the lower edge 1002, and there is a discontinuity between the two, e.g., seen at intersection 1102. One surface 1100a of the embedded part is exposed, and at least part of the opposing surface 1100b is in contact with the enlarged portion 208a.

Figure 4F:
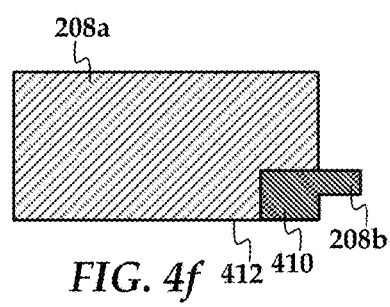
Figure 5A:
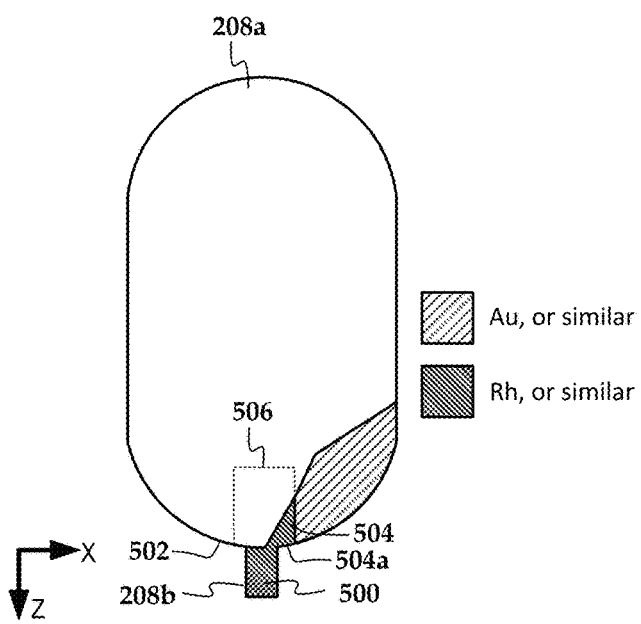
FIGS. 5a-5d are plan views of near-field transducers according to example embodiments.
Figure 5B:
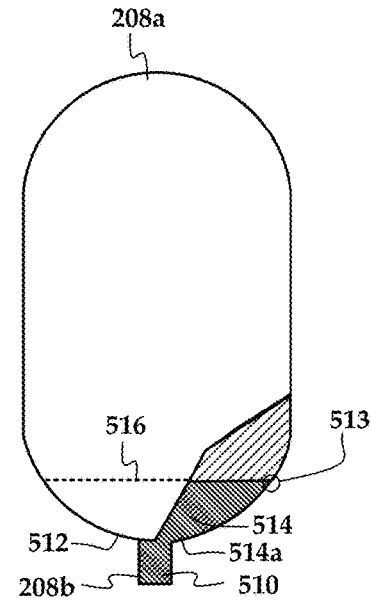
Figure 5C:
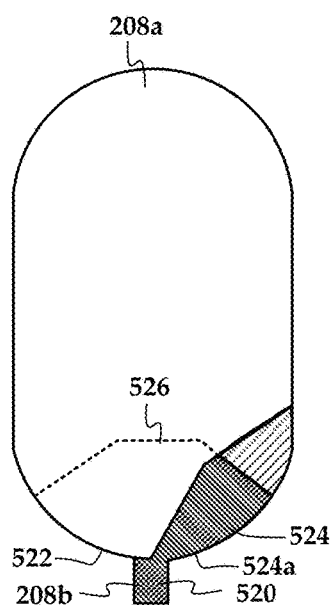
Figure 5D:
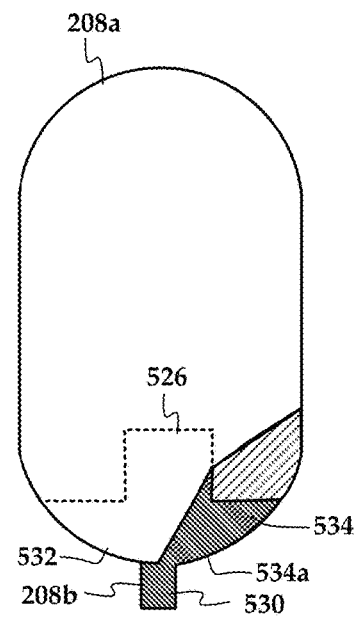
Figure 12A:
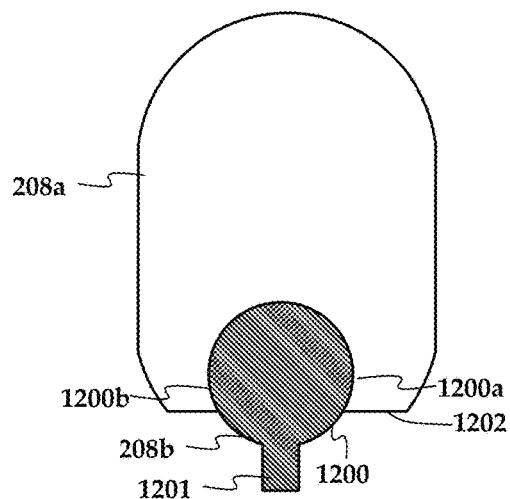
FIGS. 12a-12c are plan views of near-field transducers according to example embodiments.
Figure 12B:
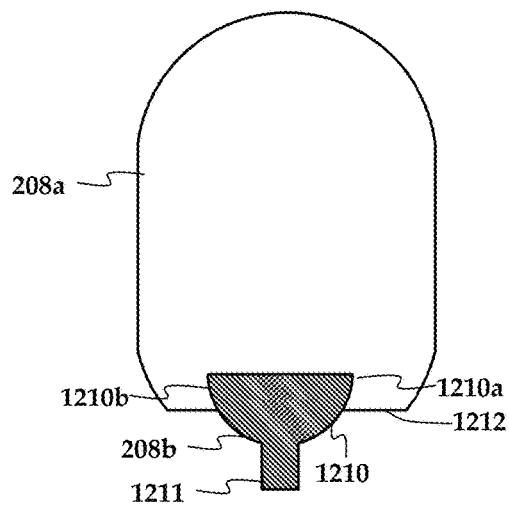
Figure 12C:
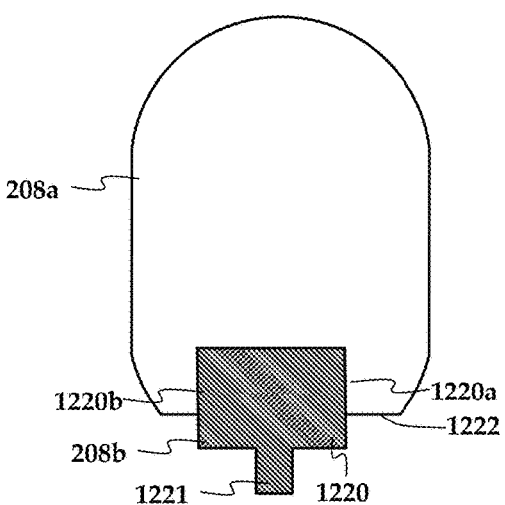

In FIGS. 12a-12c, plan views show configurations of near-field transducers with features similar to the cutaway view shown in FIG. 4f and the perspective view of FIG. 11. In these figures, pegs 208b have respective embedded parts 1200, 1210, 1220 that have one surface exposed and the opposing surface in contact with enlarged portions 208a. Edges 1200a-b, 1210a-b, 1220a-b of embedded parts 1200, 1210, 1220 are also in contact with the enlarged portion 208a, e.g., as seen in FIG. 11. Embedded part 1200 has a circular shape, embedded part 1210 has a half-circular shape, and embedded part 1220 has a square shape. Elongated outer parts 1201, 1211, 1221 extend from the embedded parts 1200, 1210, 1220, In all the embodiments shown in FIGS. 12a-c, the embedded parts 1200, 1210, 1220 extend past lower edges 1202, 1212, 1222 of the enlarged portions 208a such that the embedded parts 1200, 1210, 1220 are only partially embedded in the enlarged portions. For each of these examples, there is a discontinuity at an intersection between the lower edges 1202, 1212, 1222 of the enlarged parts 208a and the embedded parts 1200, 1210, 1220. These discontinuities are due to a difference in size and/or profile of the respective enlarged parts and embedded parts 1200, 1210, 1220.

It has been found that sharp corners between the embedded parts and the enlarged portions can lead to separation therebetween during use. Sharp corners can also have effects of the outer parts, e.g., pegs. For example, in reference again to FIG. 4b, the circled region 403 may experience separation between the enlarged portion 208a and the peg 208b (or similar structures shown elsewhere, such as embedded part 514 shown in FIG. 5b). Similarly region 513 shown in FIG. 5b may exhibit separation between the enlarged portion 208a and embedded part 514. This separation can affect NFT performance, such as thermal gradient and maximum peg temperature.

Figure 13:
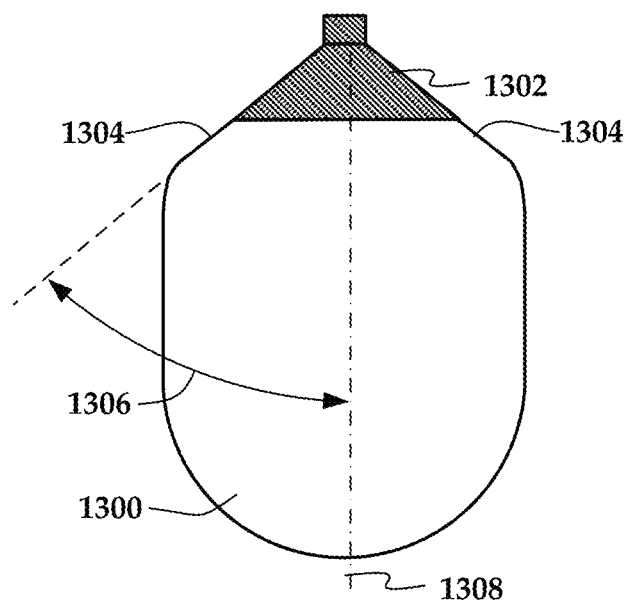
FIG. 13 is a plan view of a near-field transducer according to another example embodiment.

In FIG. 13, a top view of an NFT shows features for reducing separation of component parts according to an example embodiment. The NFT includes an enlarged portion 1300 and embedded part 1302. Linear media-facing edges 1304 of the NFT (which may encompass edges of both the enlarged portion 1300 and the embedded part 1302) are set at an angle 1306 relative to a centerline 1308 of the NFT. In this example, the angle 1306 is about 45 degrees, although could range from 5 to 90 degrees. Analysis shows that thermal gradient increases as the angle 1306 decreases, although peg temperature also increases as the angle 1306 decreases.

Figure 14:
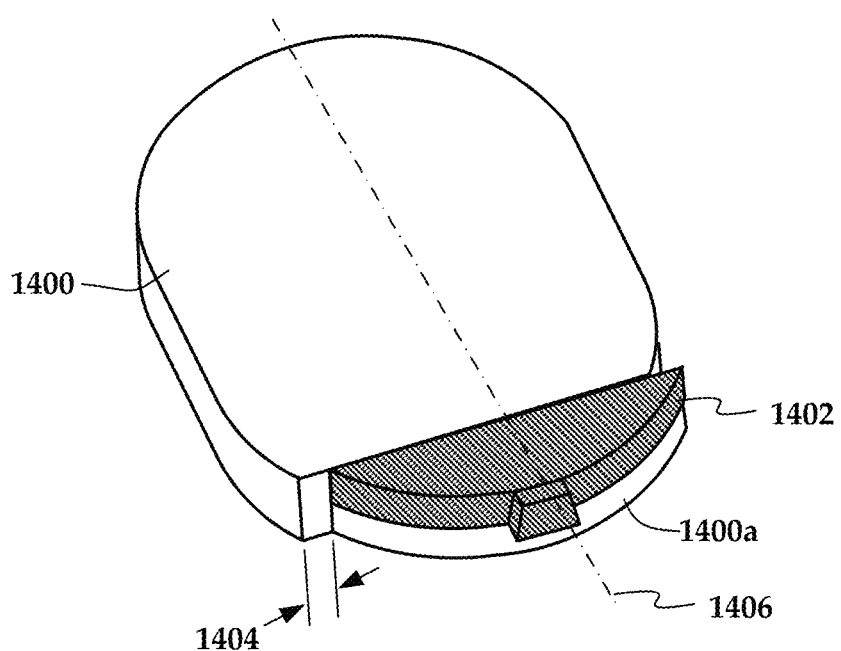
FIG. 14 is a perspective view of a near-field transducer according to another example embodiment.

In FIG. 14, a perspective view shows NFT features according to another example embodiment. The NFT includes an enlarged portion 1400 and embedded part 1402. The embedded part 1402 and part of the enlarged portion 1400a are shifted a distance 1404 relative to a centerline 1406 of the NFT. This shifted distance 1404 corresponds to a crosstrack direction of a recording head in which the NFT is used. The shifted distance may range from 5-30 nm in either direction.

Figure 15:
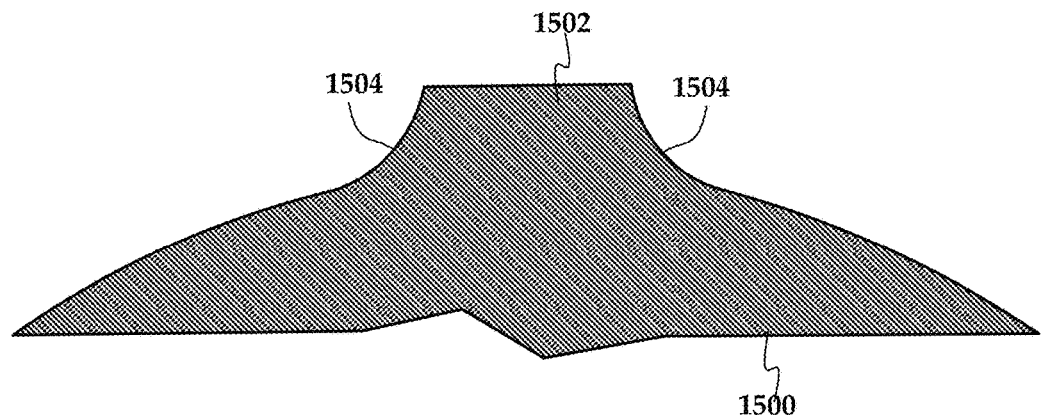
FIGS. 15 and 16 are plan views of embedded parts and pegs according to other example embodiments.
Figure 16:
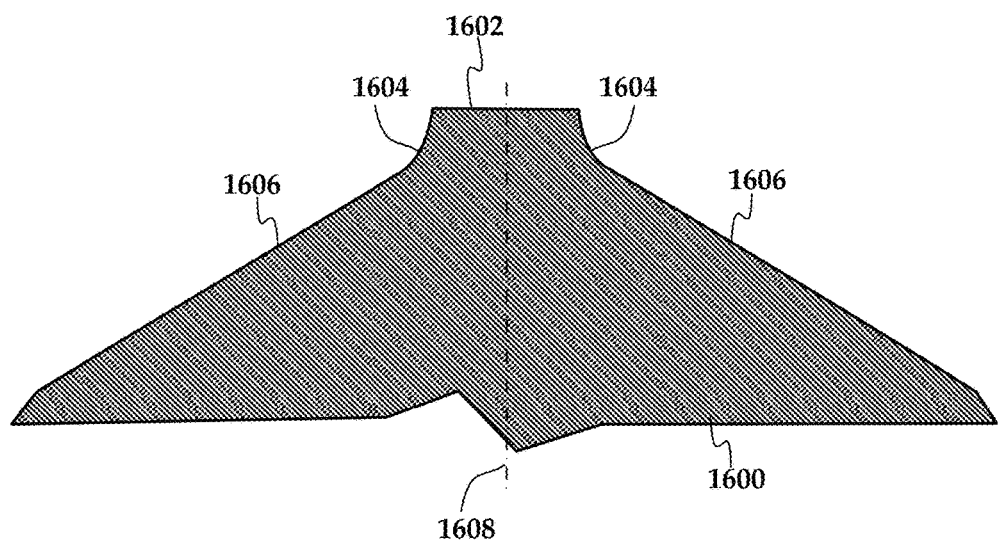

In FIGS. 15 and 16, a plan view shows features of embedded parts 1500, 1600 according to example embodiments. As seen in FIG. 15, embedded part 1500 includes a peg 1502 that is joined to via rounded fillets 1504 that reduce stresses in this region. In FIG. 16, embedded part 1600 includes a peg 1602 that is joined to via rounded fillets 1604 that reduce stresses in this region. Media-facing edges 1606 are also at a reduced angle relative to centerline 1608, similar to the embodiment shown in FIG. 13. Note that the embodiments shown in FIGS. 13-16 may include features shown elsewhere herein, including being made from the same materials, using the same or similar attachment features, and being used in the same or similar devices.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A near-field transducer, comprising:
   an enlarged portion comprising a layer of soft plasmonic material; and
   a peg embedded in a lower part of the enlarged portion that faces a media-facing surface, the peg comprising an elongated outer part that extends from a lower edge of the enlarged portion towards the media-facing surface and an embedded part that is embedded within the enlarged portion, a lower edge profile of the embedded part having an outline that matches that lower edge of the enlarged portion, the peg formed of a thermally robust plasmonic material, wherein the near-field transducer has linear, media-facing edges at an angle relative to a centerline of the near-field transducer, the angle being less than 60 degrees.

2. The near-field transducer of claim 1, whey bedded part extends into at least 10% of a length of the enlarged portion.

3. The near-field transducer of claim 1, wherein the embedded part has a flat profile facing away from the elongated outer part, the flat profile extending between two points on the lower edge of the enlarged portion.

4. The near-field transducer of claim 1, wherein the embedded part has a profile facing away from the elongated outer part with three edges that form a rectangular shape or a trapezoidal shape.

5. The near-field transducer of claim 1, wherein the soft plasmonic material comprises Au and the thermally robust plasmonic material comprises Rh, Ir, Pt, Pd, or their alloy.

6. The near-field transducer of claim 1, wherein the enlarged portion surrounds two substrate-parallel sides of the embedded part of the peg.

7. The near-field transducer of claim 1, wherein at least a portion of the embedded part comprises a thickness that is less than that of the elongated outer part.

8. The near-field transducer of claim 1, wherein the linear media-facing edges encompass both the embedded part and the enlarged portion.

9. The near-field transducer of claim 1, wherein the embedded part and part of the enlarged portion are shifted in a crosstrack direction relative to a centerline of the near-field transducer.

10. The near-field transducer of claim 1, wherein the peg is joined to the elongated part via rounded fillets.

11. A recording head, comprising:
    a magnetic write transducer;

a waveguide; and a near-field transducer, proximate the magnetic write transducer and the waveguide, the near-field transducer comprising:

an enlarged portion comprising a layer of soft plasmonic material; and a peg embedded in a lower part of the enlarged portion that faces a media-facing surface, the peg comprising an elongated outer part that extends from a lower edge of the enlarged portion towards the media-facing surface and an embedded part that is embedded within the enlarged portion, a lower edge profile of the embedded part having an outline that matches that lower edge of the enlarged portion, the peg formed of a thermally robust plasmonic material, wherein the lower edge profile of the peg and a lower edge profile of the enlarged portion comprise a curved profile.

12. The recording head of claim 11, wherein the embedded part extends into at least 10% of a length of the enlarged portion.

13. The recording head of claim 11, wherein the embedded part has a flat profile facing away from the elongated outer part, the flat profile extending between two points on the lower edge of the enlarged portion.

14. The recording head of claim 11, wherein the embedded part has a profile facing away from the elongated outer part with three edges.

15. The recording head of claim 11, wherein the enlarged portion surrounds two substrate-parallel sides of the embedded part of the peg.

16. The recording head of claim 11, wherein at least a portion of the embedded part comprises a thickness that is less than that of the elongated outer part.

17. The recording head of claim 11, wherein the embedded part and part of the enlarged portion are shifted in a crosstrack direction relative to a centerline of the near-field transducer.

18. The recording head of claim 11, wherein the peg is joined to the elongated part via rounded fillets.

* * * * *